United States Patent [19]
Allen

[11] 3,933,172
[45] Jan. 20, 1976

[54] PIPELINE SURGE RELIEVER WITH SANITARY BARRIER

[75] Inventor: Donald M. Allen, Pinole, Calif.

[73] Assignee: Grove Valve and Regulator Company, Oakland, Calif.

[22] Filed: Feb. 24, 1975

[21] Appl. No.: 552,559

[52] U.S. Cl. .................. 137/494; 137/492; 251/5; 251/57; 138/30
[51] Int. Cl.² ............... F16K 31/126; F16K 31/365
[58] Field of Search ...... 137/492, 494, 525; 138/26, 138/30; 251/57, 5, 61.1

[56] References Cited
UNITED STATES PATENTS

| | | | |
|---|---|---|---|
| 2,247,363 | 7/1941 | Dunn | 251/5 X |
| 2,353,143 | 7/1944 | Bryant | 137/492 |
| 2,954,047 | 9/1960 | Faltejsek et al. | 137/494 |

Primary Examiner—Henry T. Klinksiek
Attorney, Agent, or Firm—Melvin R. Stidham

[57] ABSTRACT

In a pressure surge relief system wherein a valve opens to relieve the pipeline when line pressure overcomes a pilot chamber gas pressure and including an accumulator which transfers the pressure of the pipeline liquid to the gas in the pilot chamber, the improvement comprising a column of relatively inert fluid which isolates the elastomer components of the accumulator from the possibly corrosive pipeline fluid.

10 Claims, 2 Drawing Figures

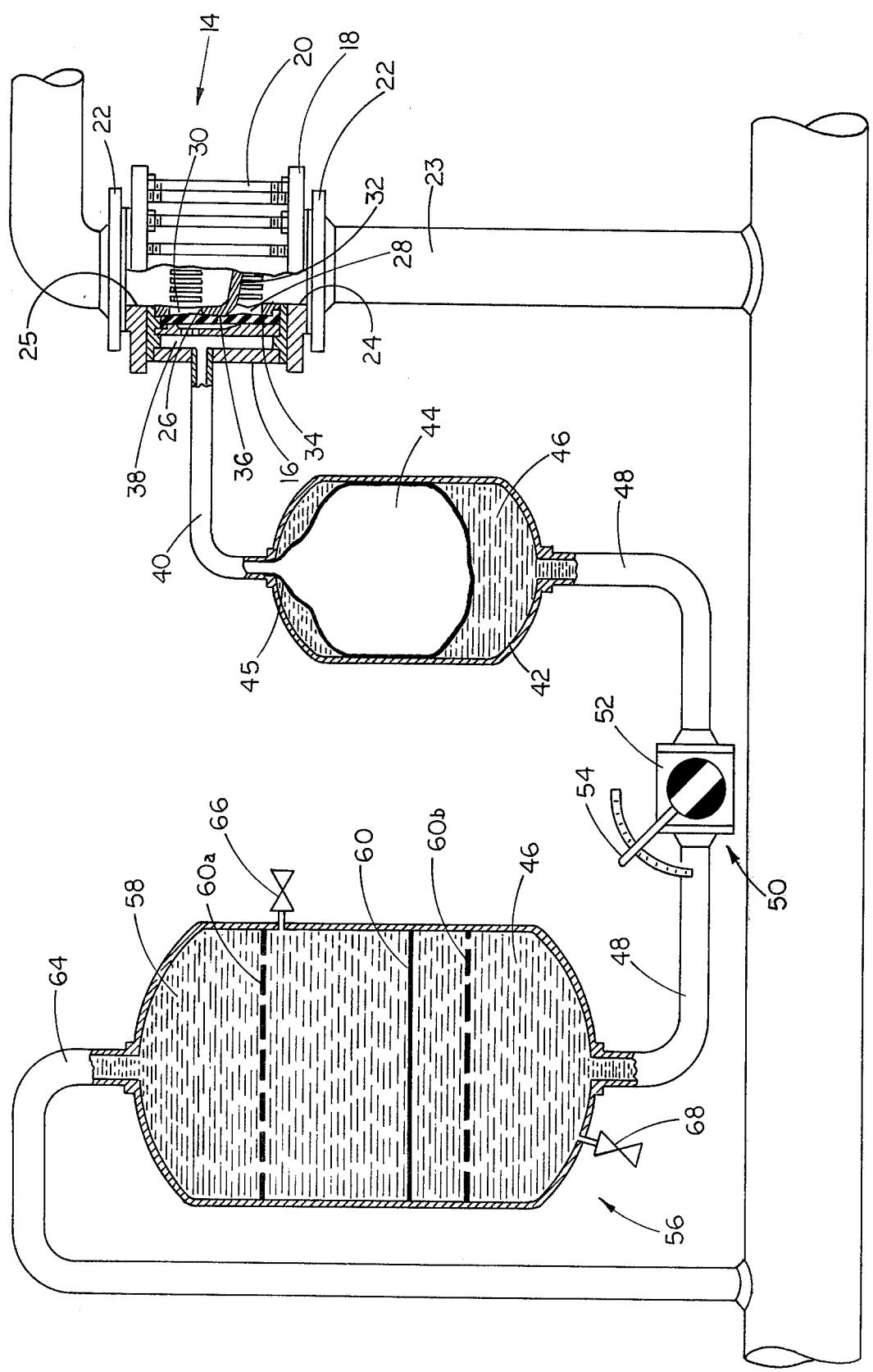
FIG.-1-

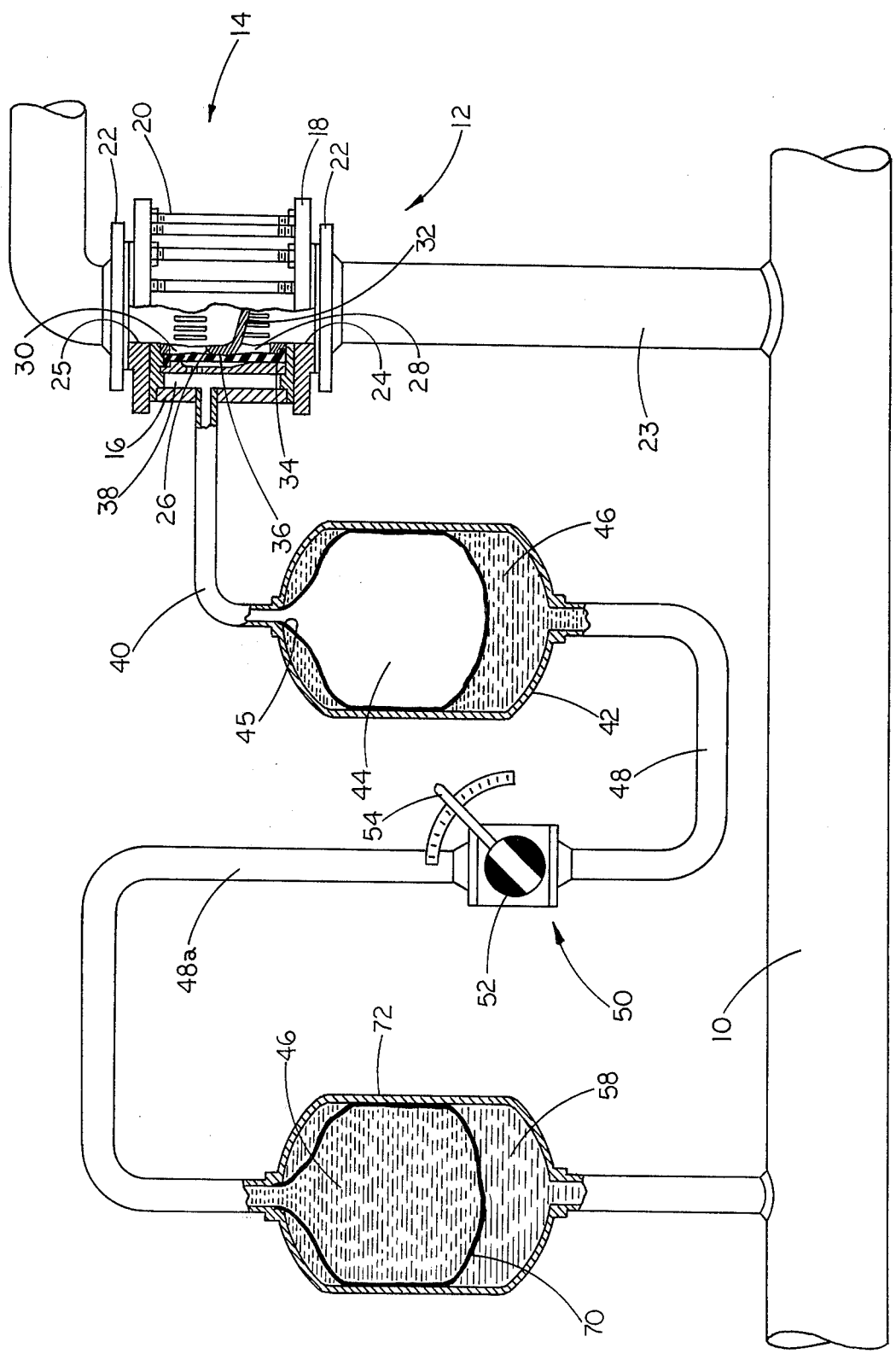
FIG.-2-

PIPELINE SURGE RELIEVER WITH SANITARY BARRIER

BACKGROUND OF THE INVENTION

In pipeline operation, starting and stopping a pump or opening or closing a valve will produce a surge in pressure which, under certain circumstances, could build up to dangerous proportions and may cause pipeline damage. In some pipeline installations, valves are provided which open at a predetermined, dangerously high pressure. However, such valves are necessarily installed at locations along the pipeline where surges are likely to be of greatest intensity, e.g., at the bottom of a steep grade, and not necessarily at locations convenient for inspection and service. Hence, it is desirable to protect against a pressure surge in a pipeline when pressure increases at too rapid a rate, even though pressure at the particular point in the pipeline has not reached an excessive level.

In one system, pipeline surges are relieved by dumping the pipeline fluid to a reservoir. A pressure-responsive valve in the dump line opens automatically when the pressure in the dump line, i.e., pipeline pressure, overcomes the pressure of gas in a pilot chamber. The pilot chamber is normally at pipeline pressure, but an orifice in the pilot load line retards pressure build-up in the event of a surge, producing a temporary imbalance between line pressure and pilot pressure, allowing line pressure to open the valve.

An accumulator, including a diaphragm, a bladder or similar device is installed in the pilot load line to maintain the pilot gas at the pressure of the pipeline liquid in the pilot load line. However, the diaphragm, the bladder or other medium for transferring pressure from pipeline liquid to gas may be susceptible to the corrosive properties of some liquids, such as crude oil.

OBJECTS OF THE INVENTION

It is an object of this invention to provide a control system for a liquid pipeline with means for asserting pipeline liquid pressures against a control component while isolating the component from the pipeline liquid.

It is a further object of this invention to provide a pipeline surge relief system including an accumulator for transferring pipeline liquid pressures to a gas with means for isolating the accumulator from the pipeline liquid.

It is a further object of this invention to provide a surge relief system including a pressure-responsive valve with a pilot gas chamber and an accumulator to transfer the pipeline liquid pressure to pilot chamber gas pressure, with a barrier to prevent exposure of the accumulator internal components to the pipeline liquid.

Other objects and advantages of this invention will become apparent from the description to follow when read in conjunction with the accompanying drawing.

BRIEF SUMMARY OF THE INVENTION

In some pressure surge relief systems, a valve opens automatically when liquid pipeline pressure overcomes the pressure of the pilot gas in a control chamber, and dumps a quantity of pipeline liquid into a reservoir. Suitable for this purpose is an expansible tube valve comprising a flexible tube which is stretched over a barrier between inlet and outlet slots, with a jacket around the tube functioning as the control chamber.

The control is normally maintained at line pressure by an accumulator which transfers the pipeline pressure in a pilot load line to the pilot gas. An orifice device in the pilot load line will retard pressure build-up in the event of flow velocity occurring during a pressure surge. Hence, the pressure surge moving through the pipeline reaches the surge relief valve while the pressure in the control chamber lags behind. As a result, the control pressure is overcome by line pressure, causing the valve to open and relieve the surge to the reservoir.

Being compressible, the gas will allow operation of the valve when its control pressure is overcome without itself being evacuated from the control chamber. As a result, the accumulator which transfers the liquid pipeline pressure to the pilot gas is a significant component of such a surge relief system. Therefore, in order to avoid the possibly corosive effects of the pipeline liquid on the elastomer materials of the accumulator, the barrier tank of this invention is installed in the pilot load line to isolate the accumulator from the pipeline liquid. In a preferred embodiment, the barrier tank contains a relatively inert liquid, which is of a different specific gravity than, and which may be relatively immiscible with, the pipeline liquid whereby the inert liquid and the pipeline liquid are largely in separate strata, though at a common pressure. Then, the connection to the accumulator is made from an elevation of the barrier tank to insure that only the inert liquid enters the accumulator.

In another embodiment of the relatively inert liquid is separated from the pipeline liquid by an elastomer diaphragm or membrane.

BRIEF DESCRIPTION OF THE DRAWINGS

In the drawings:

FIG. 1 is a schematic view of the first embodiment of the surge relief system embodying features of this invention; and FIG. 2 is a schematic view of a second embodiment of the invention.

DESCRIPTIONS OF PREFERRED EMBODIMENTS

The Embodiment of FIG. 1

The pipeline 10 shown is designed to transport a liquid under conditions which could produce a sudden surge in pressure, as when a pump (not shown) is activated. The surge relieving system 12 of this invention is designed to relieve surges whenever the rate of pressure increase is excessive, even though the pressure at the location of the surge relieving system is not at a dangerous level. Such pressure surges are relieved through a valve 14 which opens automatically when the pipeline pressure exceeds the control pressure in a pilot chamber. A suitable valve for this purpose may be the type shown in Bryant U.S. Pat. No. 3,272,470 granted Sept. 13, 1966, and comprising a cylindrical body 16 clamped between two closure plates 18 as by means of studs 20. The closure plates are, in turn, secured by any conventional means, to complementary flanges 22 in a branch line 23, with the inlet 24 directly exposed to the pipeline 10 and the outlet 25 directed to a storage reservoir (not shown). A slotted core 26 is carried within the body 16 and includes spaced circumferential rows of inlet and outlet slots 28 and 30 on opposite sides of an intermediate barrier 32. A flexible, expansible tube 34 is stretched around a cylindrical sealing surface 36 of the barrier 32, and the hoop tension of the tube 34 is supplemented by the pressure of the control gas introduced into control chamber 38 through pilot gas line 40. The capacious chamber 38 provides plenty of volume for compression of the pilot gas without requiring evacuation thereof, whereby the surge relief valve will open quickly should pipeline pressure overcome the jacket control pressure, such pipeline pressure being asserted against the interior of the flexible tube 34 through the upstream slots 28.

In operation, the control or pilot gas in the jacket 38 is normally at a pressure equal to that of the fluid in the pipeline 10, whereby the hoop tension of the stretched tube 34 will maintain a seal around the cylindrical surface 36 of the barrier 32. However, should the pipeline pressure exceed that of the jacket 38 by an amount sufficient to overcome such hoop tension, the expansible tube will expand outward and permit flow out through the upstream slots 28, around the barrier 32, and back in through the downstream slots 32 to the outlet 25, whereby a quantity of fluid producing the surge will be diverted through line 24 to a reservoir, thus relieving pressure in the pipeline 10 itself.

The fluid in the control jacket 38 is a gas which, being compressible, enables a rapid valve response should a pressure surge occur. The source of gas is an accumulator 42 wherein a gas may be contained an elastomer bag or bladder 44 which is sealed at 45 around pilot gas line 40. The outer surface of the bladder 44 is exposed to liquid 46 at pipeline pressure introduced into the accumulator chamber 42 through a pilot load line 48 in communication with the pipeline. Hence, the pilot pressure of the gas in the relief valve control chamber 38 is normally at the pressure in the pipeline 10, and any variations which occur in the pilot load line will also be transmitted to the gas in the bag 44 and jacket supply line 40 to maintain a flexible tube 34 sealed despite pressure changes, within a tolerable range. However, in the event of a flow velocity in the pilot load line 48 accompanying a pressure surge in the pipeline 10, pressure build-up at the accumulator vessel 42 is retarded by flow through an orifice device 50, such as a variable orifice, ball or plug valve 52 with a manual positioning device 54.

Also installed in the pilot load line 48 is the barrier tank 56 comprising a feature of this invention. Contained within the barrier tank 56 is a relatively inert liquid 46, which is of a different specific gravity than the crude oil or other liquid 58 being transported through the pipeline 10. As shown, the inert liquid 46 may be water, kerosene, ethylene glycol or some other liquid heavier than the crude oil 58, in which case it is carried in the lower portion of the barrier tank 56 and extends through pilot load line 48 to the accumulator vessel 42. Hence, the liquid 46 forms an isolating barrier between the pipeline liquid 58 and the elastomer bladder 44 of the accumulator vessel.

Because the liquids 46 and 58 are of different specific gravity, they present an interface 60 within the barrier tank 56, and the barrier liquid 46 and the pipeline liquid 58 are in distinct strata, particularly if the liquids are immiscible. The connection 48 from the barrier tank 56 to the accumulator 42 is made from that level of the tank wherein the barrier liquid is contained. In the illustration shown, the barrier liquid 40 is of a heavier specific gravity than that of the pipeline liquid 58 and the connection 48 from the barrier tank to the accumulator is from the bottom of the tank. Similarly, the connection 64 to the pipeline 10 is from the top of the tank 56 with the interface 60 occurring between the two liquids.

In the drawing, the solid line 60 represents the approximate level of the liquid interface when the accumulator bladder 44 is in its normal, semi-expanded configuration shown. The upper dashed line 60a represents the level of the liquid interface when the accumulator bag 44 is fully expanded, and the lower dashed line 60b represents the level of the liquid interface when the accumulator bladder is collapsed. An interface checking valve 66 is provided at a level of the tank 56 which occurs below the upper interface level 60a when the fully charged system is biased by a fully expanded bladder 44. Hence, a sample of the barrier liquid 46 is drawn off when the bladder 44 is pressurized to full expansion insures that a sufficient charge of the barrier liquid 46 is present in the system. A charging valve 68 is provided to add more of the barrier liquid as required. The system may be charged initially with the bag 44 fully expanded and if the inert barrier liquid is tapped off when the checking valve 66 is opened, one is assured that the accumulator 42 and the connection line 48 are filled and the barrier liquid 46 is at the desired level in the barrier tank 56.

Of course, while the barrier liquid 46 and the pipeline liquid 58 are generally disposed in two strata, they are at the same uniform pressure. Accordingly, any variations in pressure in the pipeline 10 will be transmitted through the barrier liquid and be asserted against the bag 44 of the accumulator vessel 42. This liquid pressure will be transferred to the gas within the bag 44 to maintain the pilot gas in the chamber 38 at the desired pressure. However, the accumulator bag 44 will be isolated from the pipeline liquid to avoid the corrosive or other deteriorting effects thereof.

The Embodiment of FIG. 2

Referring now to FIG. 2, the surge relieving system 12 is identical to that in FIG. 1, including the accumulator 42 with elastomer bag 44 and barrier liquid 46. In this embodiment however, the barrier liquid 46 is separated from the pipeline fluid 58 by a suitable elastomer diaphragm or bladder 70 of a second accumulator device 72, the bladder being sealed at 73 around the pilot load line 48a. Hence, the pipeline pressure is asserted against the exterior of the bladder 70 to maintain the barrier liquid 46 at the pressure of the pipeline liquid 58 whereby the same pressure is transmitted to the gas in the bladder 44 of the main, liquid-gas accumulator. While the bladder 70 of the second accumulator 72 is also subjected to the deteriorating effects of the pipeline fluid, it is not so serious in this case because the main liquid-gas accumulator 42 is still protected by the barrier fluid.

The system of FIG. 2 operates in much the same manner as that of FIG. 1, except that a wider range of liquids may be selected as the barrier liquid. As in the case of FIG. 1, the liquid should be relatively inert, but because of the physical separation provided by the bladder 70, it is no longer necessary that the liquid be of a different specific gravity than the pipeline liquid 58.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. In a pressure surge relief system for a liquid-transporting pipeline including:
   an accumulator for transferring the pressure of the liquid in a pipeline to a gas; and
   a pilot load duct connected between said pipeline and said accumulator;
   means for isolating the interior of said accumulator from the liquid in the pipeline comprising:
   a barrier fluid vessel connected into said pilot load duct;
   a first connection of the pilot load duct opening from a first portion of said fluid vessel to said accumulator; and
   a second connection opening from another portion of said fluid vessel to said pipeline;
   a relatively inert liquid occupying said accumulator, said first connection and said first portion of said vessel;
   the pipeline liquid occupying said second connection and said another portion of said vessel; and
   means separating said pipeline liquid and said inert liquid while equalizing pressures thereof.

2. The improvement defined by claim 1 wherein said last-named means comprises:
   an elastomeric membrane dividing said fluid vessel into first and second compartments;
   said first connection opening from said first compartment; and
   said second connection opening from said second compartment.

3. The improvement defined by claim 2 wherein:
   said elastomeric membrane comprises a bladder sealed around said first connection.

4. The improvement defined by claim 1 wherein:
   said inert liquid and said pipeline liquid are of different specific gravities and said last-named means is an interface therebetween.

5. The improvement defined by claim 4 wherein:
   said first and second connections are at different elevations on said fluid vessel.

6. The improvement defined by claim 4 wherein:
   said liquids are relatively immiscible.

7. The improvement defined by claim 5 including:
   a checking tap opening from said fluid vessel at a test level intermediate said first and second connections to insure the presence of said inert liquid at said test level at a predetermined condition of said accumulator.

8. The improvement defined by claim 7 including:
   an inert liquid charging port opening into said vessel at a level intermediate said first connection and said test level.

9. The improvement defined by claim 5 wherein:
   said inert fluid is of a heavier specific gravity than said pipeline liquid; and
   said first connection is situated near the bottom of said vessel.

10. The pressure surge relief system defined by claim 1 including:
    a surge relief line adapted for connection from a pipeline to a low pressure zone;
    a surge reliever valve in said surge relief line;
    a pressure-responsive member operating said surge reliever valve;
    a gas chamber in said surge reliever valve disposed so that the pressure of gas therein urges said pressure-responsive member in one direction to close said surge reliever valve;
    means exposing said pressure-responsive member to fluid in said surge relief line to bias it in the opposite direction;
    said accumulator maintaining the pressure in said gas chamber at the pressure in said pilot load duct; and
    flow restricting means in said pilot load duct.

* * * * *